United States Patent [19]

Arlt et al.

[11] 4,064,110
[45] Dec. 20, 1977

[54] PROCESS FOR THE PRODUCTION OF AUTOCROSSLINKABLE POLYMERS CONTAINING N-ALKOXYMETHYL GROUPS

[75] Inventors: Dieter Arlt; Josef Bremen, both of Cologne, Germany

[73] Assignee: Bayer Aktiengesellschaft, Germany

[21] Appl. No.: 665,289

[22] Filed: Mar. 9, 1976

[30] Foreign Application Priority Data

Mar. 12, 1975 Germany .............................. 2510730

[51] Int. Cl.$^2$ ...................... C08G 63/38; C08G 18/00
[52] U.S. Cl. ........................ 260/75 NB; 260/77.5 AB; 526/9; 526/16
[58] Field of Search .......... 260/75 NB, 75 NM, 75 N, 260/75 NC, 77.5 AN, 77.5 AB

[56] References Cited

U.S. PATENT DOCUMENTS

| | | | |
|---|---|---|---|
| 3,531,425 | 9/1970 | Burk et al. | 260/22 R |
| 3,652,507 | 3/1972 | Burk et al. | 260/77.5 AB |
| 3,702,320 | 11/1972 | Fritok et al. | 260/77.5 AB |
| 3,766,147 | 10/1973 | Wolgemuth | 260/77.5 AB |
| 3,813,365 | 5/1974 | Frisch et al. | 260/77.5 AB |
| 3,932,361 | 1/1976 | Russell et al. | 260/77.5 AB |

Primary Examiner—Lucille M. Phynes
Attorney, Agent, or Firm—Connolly and Hutz

[57] ABSTRACT

Storable, autocrosslinkable polymers containing N-alkoxymethyl groups are obtained by reacting 5-alkoxymethyl-1,3,4-dioxazol-2-ones with a polymer having an average molecular weight above 600 and an average of more than one Zerewitinoff-active hydrogen atom in the molecule in the presence of a catalytic quantity of at least an alkali metal salt. The new catalysts allow to carry out the reaction at a temperature in the range from 50° to 110° C and guarantee a complete reaction of the reactants into uncrosslinked but autocrosslinkable light-stable end products.

5 Claims, No Drawings

PROCESS FOR THE PRODUCTION OF AUTOCROSSLINKABLE POLYMERS CONTAINING N-ALKOXYMETHYL GROUPS

This invention relates to a process for the production of autocrosslinkable polymerisation, polycondensation and polyaddition products by reacting alkoxy acetonitrile carbonates with polymers containing Zerewitinoff-active hydrogen atoms in the presence of alkali salts of organic carboxylic acids.

It is known that autocrosslinkable high molecular weight polymerisation, polycondensation and polyaddition products can be obtained by reacting polymerisation, polycondensation and polyaddition products with a molecular weight above 600 which contain Zerewitinoff-active hydrogen atoms in the molecule, with an alkoxy methylisocyanate (cf. German Auslegeschrift No. 1,244,410).

Unfortunately, certain difficulties arise during the reaction with alkoxy methylisocyanates. On the one hand, they are unstable and readily tend towards dimerisation or trimerisation. On the other hand, they are extremely toxic and the commercially valuable members have a pronounced lacrimatory effect. Accordingly, special safety measures have to be taken for storing and handling such substances. In addition, extremely elaborate safety precautions have to be taken for the production of alkoxy methylisocyanates from α-halogen alkyl ethers and sodium cyanate, as described in German Auslegeschrift No. 1,205,087, on account of the physiological properties (carcinogenicity) of the α-halogen alkyl ethers.

In addition, it is known from U.S. Pat. No. 3,531,425 that cyclic nitrile carbonates (1,3,4-dioxazol-2 - one compounds substituted in the 5-position by a hydrocarbon radical) can be reacted with compounds containing at least one Zerewitinoff-active hydrogen atom in the presence of strong bases with a $pK_a$-value above 8 to form the corresponding hydroxamates which in turn are converted into urethanes at temperatures in the range from 30° to 170° C in the presence of the above-mentioned bases, the reaction being accompanied by the elimination of carbon dioxide. One disadvantage of this process is that the end products are heavily coloured so that they cannot be used for a number of applications, for example for the production of light-stable lacquers. Another disadvantage is that the formation of high molecular weight end products is prevented (cf. U.S. Pat. No. 3,652,507 column 13, lines 34 to 43). Another disadvantage is the incomplete elimination of carbon dioxide and, hence, the incomplete formation of the polyurethanes.

U.S. Pat. No. 3,652,507 also relates to the reaction of cyclic nitrile carbonates with compounds containing Zerewitinoff-active hydrogen atoms to form polyurethanes, but in the presence of a special catalyst comprising a combination of metal compounds soluble in the reaction mixture, one of the metal compounds containing a metal from Groups III to IV and a metal from Groups I, II and the iron series of Group VIII of the Periodic Chart of the Elements. In this process, the formation of hydroxamates as intermediate products is said to be prevented. The reaction by which the polyurethanes are formed is said to take place at temperatures in the range from 40° to 150° C. One disadvantage of this process is that it has to be carried out with catalyst combinations which are relatively difficult to obtain and which have to be produced in a separate, complicated process. It has also been found that temperatures above 120° C have to be applied, at least periodically, in order to obtain a complete reaction, so that the catalyst combinations in question cannot be used for the production of polyurethanes which, although uncrosslinked, are autocrosslinkable at temperatures beyond 120° C, for example like the products according to the invention.

It is known from U.S. Pat. No. 3,702,320 that cyclic nitrile carbonates can be reacted with mono- or polyols to form urethanes at temperatures in the range from 120° to 150° C in the presence of a metal compound of aluminum, tin, titanium, in the absence of compounds of metals of Groups I, II and VIII (iron group) or in the presence of a metal compound or iron or zinc in the absence of compounds of metals of Groups III to V of the Periodic System. This process is also unsuitable for the production of uncrosslinked urethanes which crosslink spontaneously at temperatures beyond 120° C.

It is known from German Offenlegungsschrift No. 2,338,843 that cyclic nitrile carbonates can be reacted with Zerewitinoff-active compounds in the presence of inorganic or organic fluorine compounds at −10° to 150° C inter alia to form polyurethanes. It has been found, however, that some of the inorganic fluorine compounds are insoluble in the reaction mixture and give rise to hazing in the end product, and that the fluorine compounds produce only about 50% of the required reaction after 8 hours, even at reaction temperatures of 100° C.

Finally, Journal Organic Chemistry, Vol. 39, No. 16 (1974), W. J. Kauffmann discloses the production of methoxy acetonitrile carbonate — a compound which may be used inter alia as a starting material for the purpose according to the present application.

The object of the present invention is to provide polymerisation, polycondensation and polyaddition products, autocrosslinkable through N-alkoxy methyl groups, by reacting alkoxy acetonitrile carbonates with polymerisation polycondensation and polyaddition products which contain Zerewitinoff-active hydrogen atoms in the molecule and which have molecular weights above 600. The autocrosslinkable end products should be uncrosslinked, stable in storage and substantially colourless. In principle, products of this kind may be obtained by the process disclosed in German Patent Specification No. 1,244,410 previously discussed. However, this process is not really suitable on account of the physiological dangers of alkoxy methylisocyanates especially during their production, and also on account of their instability. The processes disclosed in the U.S. Patent Specifications and in the German Offenlegungsschriften discussed earlier on are also unsuitable because in order to obtain a complete reaction, the catalysts used in those processes require reaction temperatures which lie at or above the crosslinking temperatures of the products to be obtained in accordance with the present invention, and because the end products are too heavily coloured or hazy and also some of the catalysts are too difficult to obtain. Accordingly, there was a need to find new catalysts which are easy to obtain and which guarantee a complete reaction of the reactants into uncrosslinked, but autocrosslinkable light-stable end products at temperatures below 110° C.

According to the invention, this object is achieved by using alkali metal salts of monobasic or polybasic, aliphatic cycloaliphatic, araliphatic or aromatic carboxylic acids as catalysts.

Accordingly, this invention relates to a process for the production of storable, autocrosslinkable polymers containing N-alkoxy methyl groups which are soluble in organic solvents by reacting 5-alkoxymethyl-1,3,4-dioxazol-2-ones ( = cyclic alkoxy acetonitrile carbonates) with polymerisation, polycondensation or polyaddition products which have an average molecular weight above 600 and which, on average contain more than one Zerewitinoff-active hydrogen atom in the molecule, at temperatures in the range from 50° C to 110° C with substantially complete elimination of carbon dioxide from the 5-alkoxymethyl-1,3,4-dioxazol-2-ones, in the presence of a catalytically active quantity of a catalyst and optionally in the presence of an organic solvent, distinguished by the fact that at least one alkali metal salt of a carboxylic acid is used as the catalyst.

The alkali metal salts of the carboxylic acids preferably correspond to formula (I)

in which R represents a linear or branched, saturated or unsaturated aliphatic hydrocarbon radical with 1 to 22 carbon atoms, or a cycloaliphatic saturated but monoolefinically unsaturated, optionally substituted (by $C_1$ to $C_4$- alkyl or by phenyl radicals) hydrocarbon radical with 5 to 20 carbon atoms, or an araliphatic, saturated or unsaturated hydrocarbon radical with 7 to 8 carbon atoms or an aromatic optionally substituted (by $C_1$ to $C_4$-alkyl) hydrocarbon radical with 6 to 10 carbon atoms and A represents sodium, potassium, rubidium or caesium and $n = 0$ or 1.

It is preferred to use alkali metal salts of formula I in which A represents sodium and R represents an aliphatic linear or branched, saturated or unsaturated hydrocarbon radical with 2 to 12 carbon atoms, more especially a linear or branched, saturated aliphatic hydrocarbon radical with 2 to 6 carbon atoms. $n$ is preferably 0. The following are mentioned as examples of the carboxylic acids on which the alkali metal salts are based: acetic acid, propionic acid, butyric acid, isobutyric acid, valeric acid, isovaleric acid, methylethyl acetic acid, pivalic acid, caproic acid, oenanthic acid, caprylic acid, pelargonic acid, capric acid, undecylic acid, lauric acid, tridecylic acid, myristic acid, pentadecylic acid, palmitic acid, margaric acid, stearic acid, nonodecylic acid, arachic acid, eicosanoic acid, behenic acid, acrylic acid, methacrylic acid, crotonic acid, isocrotonic acid, angelic acid, tiglic acid, citronellic acid, undecylenic acid, oleic acid, elaidic acid, erucic acid, brassidic acid, cyclopentane carboxylic acid cyclohexane carboxylic acid, methyl cyclohexane carboxylic acids, tert.-butyl cyclohexane carboxylic acids, cyclohexane carboxylic acids, methyl cyclohexene carboxylic acids, tert.-butyl cyclohexene carboxylic acids, abietic acid, phenyl acetic acid, phenyl propionic acid, succinic acid, adipic acid, pimelic acid, azelaic acid, sebacic acid, eicosane dicarboxylic acid, maleic acid, citraconic acid, itaconic cyclopentane dicarboxylic acids, cyclohexane dicarboxylic acids, such as hexahydrophthalic acids, methyl hexahydrophthalic acids, tert.-butyl hexahydrophthalic acids, benzoic acid, 2-methyl-, 3-methyl-, 4-methyl-, and 4-tert.-butyl benzoic acid, preferably propionic acid, butyric acid, isobutyric acid, valeric acid, isovaleric acid, methylethyl acetic acid, pivalic acid, hexahydrophthalic acids and 4-tert.-butyl benzoic acid.

By virtue of these readily obtainable, simple catalysts the process according to the invention enables polymers containing N-alkoxy methyl groups, which are autocrosslinkable soluble inorganic solvents and largely stable in storage to be obtained in substantially quantitative yields. It is surprising that the catalysts used in accordance with the invention enable the addition products of polymers containing Zerewitinoff-active hydrogen atoms and cyclic alkoxy acetonitrile carbonates to be completely converted into polymers containing N-alkoxy methyl groups with elimination of carbon dioxide, even at temperatures below 110° C thereby providing for the production of autocrosslinkable but uncrosslinked products containing N-alkoxy methyl groups, because under the same reaction conditions, conventional catalysts result in the formation of incompletely reacted and/or too heavily coloured or crosslinked products. Another considerable advantage is that the colour index of the end products obtained by the process according to the invention is no worse than that of the starting polymers containing Zerewitinoff-active hydrogen atoms.

Suitable starting materials for the process according to the invention include all known kinds of high molecular weight polymerisation polycondensation and polyaddition products provided that an average of more than one Zerewitinoff-active hydrogen atom is present in the molecule. Preferred starting materials are polymerisation polycondensation and polyaddition products containing hydroxyl groups more especially copolymers containing hydroxyl groups and polyesters containing hydroxyl groups.

Suitable polycondensation and polyaddition products are, in particular, polyesters, polyethers, polythioethers, polyacetals, polyamides, polyepoxide resins with hydroxyl groups in the molecule, phenol-formaldehyde resins, aminoplasts and their modification products with polyfunctional alcohols, aniline-formaldehyde resins, polyazomethines, polyurethanes, polyureas and polythioureas, polysulphonamides melamine derivatives and cellulose derivatives.

Some special examples are mentioned in the following list: polyesters of polycarboxylic acids, such as adipic acid, succinic acid, maleic acid, phthalic acid, isophthalic acid, terephthalic acid, tetrachlorophthalic acid, hexahydrophthalic acid, hexachloro-endomethylene-tetrahydrophthalic acid, trimellitic acid, pyromellitic acid and polyalcohols such as ethylene glycol butane diols hexane diols, 2,2-dimethyl-1,3-propane diol, diethylene glycol, di-β-hydroxyethyl butane diol, tripropylene glycol, xylylene glycol, glycerol, trimethylolpropane, pentaerythritol, mannitol and their hydroxy alkylation products; polyesters of hydroxy pivalic acid, thioglycolic acid, ω-hydroxy decanoic acid, caprolactone and diketene; polyesters of the above-mentioned dicarboxylic acid and polyphenols, such as hydroquinone, 4,4'-dihydroxy biphenyl or bis-(4-hydroxyphenyl)-sulphone; polyesters modified with fatty acids ("oil alkyds") also naturally occurring saturated or unsaturated polyesters, their degradation products or transesterification products with polyols, such as castor oil, tall oil, soya oil, linseed oil; polyesters of carbonic acid obtainable from hydroquinone, diphenylol propane, p-xylylene glycol, ethylene glycol, butane diol or 1,6-hexane diol and other diols by conventional condensation reactions, for example with phosgene or diethyl or diphenyl carbonate, or from cyclic carbonates, such as glycol carbonate or vinylidene carbonate in known manner by polymerisation; polyesters of silicic acid, for example of dimethyl dichlorosilane and polyfunctional alcohols or phenols of the above-mentioned kind; polyesters of phosphonic acids, for example of methane, ethane, β-chloroethane, benzene or styrene phosphonic acid, chloride or phosphonic acid ester and polyalcohols or polyphenols of the above-mentioned type; polyesters of phosphorous acid, phosphorous acid esters, ester amides or ester chlorides and polyalcohols, polyether alcohols and polyphenols; polyesters of phosphoric acid, for example products obtainable from polyesters of phosphorous acid by oxidation or by transesterification of phosphoric acid esters with polyalcohols or polyphenols; polyesters of boric acid; polysiloxanes such as, for example the products obtainable by hydrolysing dialkyl dichlorosilanes with water, followed by treatment with polyalcohols or the products obtainable by the addition of polysiloxane dihydrides with olefins, such as allyl alcohol and acrylic acid. Polyethers of alkylene oxides, such as ethylene oxide, propylene oxide, 2,3-butylene oxide, epichlorhydrin and the bis-(2,3-epoxypropyl ether) of diphenylolpropane, of trimethylene oxide, 3,3-bis-(chloromethyl)-oxacyclobutane or tetrahydrofuran, of hexane diol, pentamethylene glycol, decamethylene glycol and of hydroxyalkylated phenols such as, for example, O-O-di-(β-hydroxyethyl)resorcinol; polyether polythioethers, more especially of thiodiglycol, basic polyethers, for example of di-(β-hydroxypropyl)-methyl amine, di-(β-hydroxyethyl)-cyclohexyl amine, di-(β-hydroxyethyl)-aniline and di-(β-hydroxyethyl)-m-toluidine; polythioethers, for example the reaction products, known as thioplasts, of aliphatic dihalogen compounds, such as 1,2-dichloroethane, bis-(2-chloroethyl)-ether or bis-(2-chloroethyl)-formal which contain mercaptan groups, also their alkoxylation products. Polyamines, for example polyethylene imines, their cyanethylation and hydroxy alkylation products, more especially reaction products of polyalkylene polyamines with epichlorhydrin, also the hydrogenation products of cyanoethylated high molecular weight polyamines and polyalcohols, also polyether alcohols or polyesters. Polyacetals of formaldehyde and diols, such as butane diol, hexane diol; polyoxymethylenes, for example copolymers of formaldehyde or trioxane with 1,3-dioxolane, 1,3-oxthiolane or ethylene oxide; naturally occurring polyacetals, such as cane sugar, invert sugar, starch, dextrin, cellulose and their alkylation, acylation, transesterification and degradation products; spirocyclic polyacetals of pentaerythitol and glyoxal; polymercaptals, especially those of formaldehyde and 1,4-tetramethylene dimercaptan or 1,6-hexamethylene dimercaptan; polyamides of diamines, such as diaminodiphenyl methane and propane, m-xylylene diamine, ethylene diamine, tetramethylene diamine or hexamethylene diamine and polycarboxylic acids of the type mentioned above (in reference to polyesters), dimeric fatty acids, also mineral acids of the phosphoric acid, phosphorous acid and phosphonic acid type; polypeptides of natural or synthetic amino acids, such as glycine, alanine, 4-aminobutyric acid, 6-aminocaproic acid or 17-aminoheptadecanoic acid; polyamides of lactams, more especially of 6-caprolactam; also naturally occurring polypeptides and their degradation products, for example gelatin or casein; in addition polyimides containing terminal amino groups such as, for example, polydibenzimidazoles and polyimides of pyromellitic acid anhydride and diamines, also the known modification products of polyphosphornitrile chlorides with polyamines, aminoalcohols or polyalcohols; also polyester amides of the above-mentioned polycarboxylic acids, polyalcohols and polyamines, or of polycarboxylic acids and aminoalcohols such as ethanolamine, 4-amino-1-butanol, 6-amino-1-hexanol, diethanolamine or aminophenols. Also the condensation products known as polyhydrazides of dicarboxylic acids and hydrazine, the methylene polyamides of dinitriles and formaldehyde, also the polysulphonamides, for example of n-hexane-1,6-bis-sulphonic acid chloride or m-benzene-bis-sulphonic acid chloride and 1,6-hexamethylene diamine; polyazomethines, for example of terephthaldialdehyde and ethylene diamine, hexamethylene diamine, tetrachloro-p-phenylene diamine, 4,4'-diaminodiphenyl ether or 4,4'-diaminodiphenyl methane; polyepoxide resins, for example the relatively high molecular weight resins containing secondary hydroxyl groups based on the bis-(2,3-epoxypropyl)-ether of 1,4-butane diol or diphenylol propane, bis-(2,3-epoxypropyl)-N,N'-dimethyl-4,4'-diaminodiphenyl methane and their modification products with polyisocyanates, unsaturated carboxylic acids, natural resinic acids or with phenol, melamine and urea-formaldehyde resins; phenolformaldehyde resins, for example those obtainable by the usual methods, especially in the presence of excess formaldehyde from phenol, cresols, xylenols, resorcinol or diphenylol alkanes by acid or alkaline condensation, and their cyanoethylation and hydrogenation products; aminoplast resins, for example based on urea, thiourea, melamine, dicyanodiamide, adipic acid diamide, hexamethylene diurea, ethylene urea, acetylene urea or m-benzene disulphonamide, and their modification products with polyols; also aniline-formaldehyde resins and ketone resins, for example condensation products of cyclohexanone and formaldehyde. Melamine; polyureas obtainable for example, from hexamethylene diamine or bis-(γ-aminopropyl)-ether by condensation with carbon dioxide, urea or diphenyl carbonate, from 1,10-decane methylene diamine by condensation with 1,6-hexamethylene-bis-ethyl urethane or by the polyaddition of diamines, such as 4,4'-diaminodiphenyl methane, 4,4'-diaminodiphenyl, 1,8-octamethylene diamine, sodium 2,6-diaminotoluene-4-sulphonate, with polyisocyanates such as 1,6-hexamethylene diisocyanate, 2,4-tolylene diisocyanate or 4,4'-diisocyanatodiphenyl methane; polythioureas obtainable, for example, from hexamethylene diamine or p-xylylene diamine by condensation with carbon disulphide or tritiocarbonic acid esters or by the polyaddition of diamines with diisothiocyanates, for example hexamethylene diiso-thiocyanate; polyurethanes obtainable, for example, from low molecular weight monoalcohols or polyalcohols, such as ethylene glycol, propylene glycol, butane diol, hexane diol, diethylene glycol, triethylene glycol, thiodiglycol, N,N-di-(β-hydroxyethyl)-aniline or -m-toluidine, N-methyl diethanolamine, hydroquinone-di-(β-hydroxyethyl)-ether, adipic acid-di-(β-hydroxyethyl)-ester, N,N,N',N'-tetra-(2-hydroxypropyl)-ethylene diamine, glycerol, trimethylolpropane, mannitol or glucose, by polyaddition with polyisocyantes, such as hexamethylene diisocyanate, tetramethylene diisocyanate, tolyene diisocyanate, p-phenylene diisocyanate, 4,4'-diisocyanatodiphenyl methane, 1,5-naphthylene diisocyanate, 4,4',4''-triphenyl methane triisocyanate or 4,4',4''-triisocyanatotriphenyl thiophosphate; from high molecular weight polyhydroxyl compounds, such as saturated or unsaturated polyesters, polyethers, polyacetals, polythioethers or polyester amides of the above-mentioned type containing hydroxyl and, optionally, also carboxyl groups, by polyaddition with polyisocyanates or masked polyisocyanates in the presence of conventional low molecular weight chain extenders, such as water, glycols, hydrazines, hydrazides, diamines and aminoalcohols, or from bis-chloro formic acid esters such as ethylene glycol-bis-chloroformic acid ester or butane diol-1,4-bis-chloroformic acid ester, by condensation with diamines or polyamines such as ethylene diamine, hexamethylene diamine, bis-(3-aminopropyl)-ether, piperazine, 1,4-diaminocyclohexane, bis-(4-amino-3-methylphenyl)-methane, p-phenylene diamine or diethylene triamine.

Suitable polymerisation products for the process according to the invention include any polymers with a molecular weight above 600 and Zerewitinoff-active hydrogen atoms in the molecule. Homopolymers or copolymers of the following compounds for example represent suitable polymerisation products: (meth)acrylic acid-β-hydroxyethyl ester, (meth)acrylic acid-β-hydroxypropyl ester, (meth)acrylic acid-4-hydroxybutyl ester, α-chloroacrylic acid-β-hydroxyl propyl ester, αphenyl acrylic acid-β-hydroxypropyl ester, α-ethyl acrylic acid-2-hydroxy-3-phenoxypropyl ester, (meth)acrylic acid-2-hydroxy-3-chloropropyl ester, (meth)acrylic acid-4-hydroxyphenyl ester, (meth)-acrylic acid-6-hydroxy hexyl ester, 4-hydroxymethyl styrene, (meth)acrylic acid-2-aminoethyl ester, (meth)acrylic acid-2-hydroxyethyl amide, (meth)acrylic acid-N-di-(β-hydroxyethyl)-amide, (meth)acrylic acid-4-hydroxyphenyl amide, (meth)acrylic acid-4-hydroxybutyl amide, vinyl-2-hydroxyethyl ether, 4-(2-hydroxyethyl)-styrene, allyl alcohol, (meth)acrylic acid trimethylol methyl amide, maleic acid-di-2-hydroxyethyl ester, maleic acid-mono-2-hydroxyethyl ester, maleic acid methyl-2-hydroxyethyl ester, (meth)acrylic acid-3-di-(β-hydroxyethyl)-aminopropyl amide, (meth)acrylamide, acrylic acid hydrazide, N-hydroxy methacrylamide, acrylic acid, methacrylic acid, vinyl sulphonic acid and vinyl sulphonamide.

However, preferred starting materials are copolymers of 0.5 to 25% and preferably of 5 to 10% of the above-mentioned isocyanate-functional monomers with one or more of the following polymerisable compounds: acrylic acid methyl, ethyl, butyl or 2-ethyl hexyl ester or methacrylic acid methyl, ethyl, butyl, 2-ethyl hexyl or allyl ester, styrene, α-methyl styrene, chlorinated styrenes, vinyl acetate, vinyl butyrate, vinyl chloride, vinylidene chloride, vinyl butyl ether, vinyl pyridine, N-vinyl pyrrolidone, N-vinyl oxazolidone, N-vinyl ureas, N-vinyl urethanes, ethylene, propylene, butadiene, isoprene, dimethyl butadiene, chloroprene, glycol diacrylates, acrylonitrile.

It is also possible to use polymers in which isocyanatefunctional groups have been produced by an aftertreatment, for example by a grafting reaction or by a hydrolysis process Polymers of this kind include, inter alia, polyvinyl alcohol, prehydrolysed polyvinyl acetate, prehydrolysed polyvinyl acetate/polyethylene copolymer, prehydrolysed polyacrylic esters, prehydrolysed polyvinylidene carbonates, hydrogenation products of ethylene/carbon monoxide copolymers, graft polymers of vinyl compounds, such as vinyl chloride, vinyl acetate or acrylonitrile, on linear or branched polyethers, polyacetals or on polymers of the above-mentioned type which contain isocyanate-functional groups.

The high molecular weight starting materials for the process according to the invention may have a linear or branched structure and a molecular weight in the range from 600 to 500,000, preferably from 600 to 100,000. The molecular weights Mn are determined by osmometric methods.

Any alkoxy acetonitrile carbonates corresponding to the formula

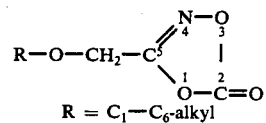
$R = C_1 - C_6$-alkyl are suitable for reaction with the starting materials containing Zerewitinoff-active hydrogen atoms. However, it is preferred to use the lower members of the series for example, methoxy, ethoxy, propyloxy and isopropyloxy acetonitrile carbonate. It is particularly preferred to use methoxy acetonitrile carbonate.

Alkoxy acetonitrile carbonates may be obtained in accordance with W. J. Kauffman's method for the production of methoxy acetonitrile carbonate (J.Org. Chem. 39, 2472 (1974), by reacting the corresponding alkoxy acethydroxamic acids with excess phosgene in ether at room temperature.

In addition, according to earlier German Patent Application P 24 46 437.7, filed Sept. 28, 1974 (corresponds to British Patent Application 39093/75), methoxy acetonitrile carbonate can be obtained from methoxy acetic acid methyl ester via the hydroxamic acid stage by the following so-called "one-pot" process:

205 g of a 30% solution of sodium methylate in methanol are added dropwise over a period of 4 to 5 hours at 10° C to a mixture of 104 g of methoxy acetic acid methyl ester, 250 ml of methanol and 90 g of freshly precipitated hydroxyl ammonium sulphate. After stirring for 2 hours, another 180 g of sodium methylate solution are added dropwise over a period of 30 minutes. After stirring for another 4 hours at room temperature, 300 ml of water are added and the methanol is distilled off in a water jet pump vacuum. The resulting aqueous solution of the sodium salt of methoxy acethydroxamic acid is acidified to pH 4 with concentrated hydrochloric acid. Following the addition of 350 ml of methylene chloride, 120 g of phosgene are introduced with vigorous stirring at 0° C. At the same time the dropwise addition of a 30% aqueous sodium hydroxide solution ensures that the pH-value of the solution always remains between pH 2.5 and pH 4.5. After stirring for 1 hour, excess phosgene is destroyed by the dropwise addition of more sodium hydroxide solution. The mixture is left standing until phase separation is complete, after which the phases are separated and the aqueous phase extracted with methylene chloride. After drying over zeolite, the solvent is distilled off, 98 g of methoxy acetonitrile carbonate being obtained after distillation in an oil pump vacuum. The yield amounts to 75% by weight of the theoretical yield.

In the process according to the invention, any Zerewitinoff-active hydrogen atom present in a polymerisation, polycondensation or polyaddition product, may be converted by an addition and rearangement reaction into a group substituted by the N-alkoxy methyl radical. For example, free hydroxyl groups in high molecular weight compounds are converted into N-alkoxy methyl urethane groups by the action of alkoxy acetonitrile carbonates in accordance with the following equation:

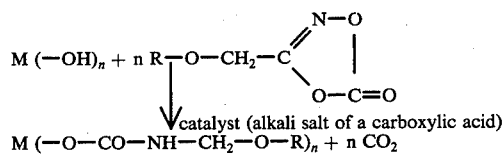

(M = macromolecule; R = alkyl radical; $n$ = integer).

The reaction conditions under which the high molecular weight starting materials are reacted with alkoxy acetonitrile carbonates in accordance with the invention may vary within certain limits in view of the diversity of the possible starting materials and their physical chemical properties. The reaction may be carried out at temperatures in the range from 50° to 110° C and preferably at temperatures in the range from 70° to 110° C, in the presence or absence of a solvent. The reaction is preferably carried out in solution.

Suitable solvents or diluents are, generally, compounds which are inert with respect to nitrile carbonates, such as aromatic hydrocarbons, for example benzene, toluene, xylene optionally in admixture with aliphatic hydrocarbons, such as ligroin (boiling point above 80° C under normal pressure), chlorinated hydrocarbons such as chlorobenzene, chlorotoluene, dichlorobenzene, ethers, such as ethylene glycol dimethyl ether, ethylene glycol diethyl ether, esters, for example ethylene glycol monomethyl ether acetate, ketones for example ethyl methyl ketone, sulphones, such as sulpholan, sulphoxides such as dimethyl sulphoxide, nitriles such as acetonitriles or mixtures thereof.

The high molecular weight compounds and the catalyst may be initially introduced either as such or in the form of 10 to 80% by weight, preferably 50 to 70% by weight solutions followed by addition of the nitrile carbonate either as such or in solution, or vice versa.

The quantity in which the catalyst is used should be kept as small as possible to ensure that the end product is affected as little as possible by the presence of residual catalyst. In general, the preferred catalysts described earlier on are used in a quantity of approximately 0.1% by weight to approximately 1% by weight and preferably in a quantity of approximately 0.2% by weight to approximately 0.5% by weight, based on the weight of the alkoxy acetonitrile carbonate.

Based on the Zerewitinoff-active hydrogen atoms present in the high molecular weight compound, the alkoxy acetonitrile carbonate may be used in a substantially equimolar quantity or even in a deficit (of about 0.5 mol per Zerewitinoff-active hydrogen atom), depending upon the type of end products required. It is preferred to use substantially equimolecular quantities of alkoxy acetonitrile carbonate.

In general, the process according to the invention is carried out as follows:

The alkoxy acetonitrile carbonate is added dropwise with stirring over a period of 2 to 3 hours at 70° to 110° C to a mixture of the high molecular weight compound, the catalyst and an inert solvent. The evolution of $CO_2$ begins immediately after the beginning of the dropwise addition. One completion of the dropwise addition, the reaction mixture is stirred at the reaction temperature until the evolution of $CO_2$ has ceased.

The products obtained in this way represent valuable autocrosslinkable storable plastics or plastics intermediates. They are particularly suitable for use in the production of light-stable coating compositions. They may be crosslinked in known manner, for example by heating and/or by the action of acid catalysts.

The process according to the invention is illustrated by the following Examples, in which the percentage contents quoted relate to weight, unless otherwise indicated.

EXAMPLE 1

150 g of a relatively high molecular weight epoxide resin based on 2,2-bis-(p-hydroxy phenyl)-propane and epichlorhydrin (average molecular weight 3500) with secondary hydroxyl groups and terminal epoxy groups (percentage OH-content 3.2) were dissolved at 100° C in 200 g of chlorobenzene and the resulting solution was reacted for 6 hours with 18.5 g of methoxy acetonitrile carbonate in the presence of 0.05 g of the Na-salt of pivalic acid, the reaction being accompanied by elimination of the theoretical quantity of $CO_2$. The solvent was then removed in vacuo at temperatures of up to 70° C leaving 161.5 g of an uncrosslinked, clear, substantially colourless storable resin. The resin was then heated to 130° C to yield a highly crosslinked transparent, infusible plastics material after only a short time, even in the absence of acids as catalyst.

EXAMPLE 2

100 g of a heavily branched N-methylol polyether (4% OH) obtained by the process according to German Auslegeschrift No. 1,049,094 from urea, formaldehyde, hexane triol and bishydroxy alkylated 1,4-butane diol, were reacted for 3 hours at 95° C with 15.4 g of methoxy acetonitrile carbonate in 150 g of dioxane in the presence of 0.05 g of the sodium salt of propionic acid as catalyst, the reaction being accompanied by the elimination of $CO_2$(97% of the theoretical). A clear indefinitely storable dioxane solution was obtained. Removal of the solvent at temperatures above 120° left a highly crosslinked insoluble reaction product.

EXAMPLE 3

100 g of a partially hydrolysed high molecular weight copolymer of ethylene and vinyl acetate (approximately 70:30), which contained 3.3% of secondary hydroxyl groups, were dissolved at 80° C in 330 g of anhydrous butyl acetate, and the resulting solution was heated for 6 hours to 90° C with 12.7 g of methoxy acetonitrile carbonate in the presence of 0.05 g of the sodium salt of butyric acid as catalyst a complete reaction being obtained. An indefinitely storable solution of the high molecular weight polyaddition product, which was clear and colourless even at room temperature was obtained. By casting this solution on to substrates following the addition of catalytic quantities of p-toluene sulphonic acid (0.2%, based on solids), films were obtained which crosslinked when heated to 100° C and which were insoluble in butyl acetate.

EXAMPLE 4

The procedure was exactly the same as described in Example 3, except that a high molecular weight copolymer containing 11.2% of secondary hydroxyl groups was used and the reaction was carried out with 100 g of polymer, 330 g of dioxane, 0.1 g of Na-butyrate and 43 g of methoxy acetonitrile carbonate. Whereas the starting material showed only poor solubility in indifferent apolar solvents, the polyurethane molecule formed by polyaddition reactions with evolution of $CO_2$ (95% of the theoretical), by virtue of its N-methylol methyl ether groups, was found to be highly soluble in toluene, chlorobenzene, xylenes, n-butyl acetate and also showed excellent stability in storage. The solutions were spread-coated on to glass plates following the addition of catalytic quantities of acid catalysts (0.2%, based on solids) or acid-liberating agents, highly cross-linked insoluble films were obtained after drying for 30 minutes at 160° C.

EXAMPLE 5

50 g of a homopolymer of methacrylic acid-β-hydroxy propyl ester were dissolved in 90 g of glycol acetate and the resulting solution was heated for 5 hours to 90° C with 4.6 g of methoxy acetonitrile carbonate in the presence of 0.05 g of sodium propionate as catalyst. Approximately 98% of the theoretical quantity of $CO_2$ was evolved. When dried on glass plates for 40 hours at room temperature, or even only for 4 hours at 70° C the polymer solution obtained left colourless clear films which were readily soluble in organic solvents. The polymer solution was crosslinked with catalytic quantities (0.2% based on solids) of a strong acid, for example p-toluene sulphonic acid, phosphoric acid or sulphuric acid to yield a crosslinked insoluble polymer was obtained after heating for 60 minutes at 160° C.

EXAMPLE 6

0.05 g of sodium butyrate and 11.3 g of methoxy acetonitrile carbonate were added to 1000 g of a 20% solution of a copolymer of 90% of ethyl acrylate and 10% of β-hydroxy ethyl acrylate in toluene. After heating for 5 hours to 100° C, 98% of the nitrile carbonate had reacted. After it had been applied to substrates and dried, the polymer solution gave clear, colourless films which were readily soluble in organic solvents. Following the addition of catalytic quantities of strong acids (0.1%, based on solids) it was found that the polymer could be crosslinked over a period of 30 minutes at 100° C.

EXAMPLE 7

0.05 g of sodium butyrate and 2.3 g of methoxy acetonitrile carbonate were added to 1000 g of a 10% solution of a copolymer of 95% of acrylonitrile and 5% of methacrylic acid-β-hydroxy-propyl ester in dimethyl formamide, and the mixture was left to react for 5 hours at 90° C to a conversion of 97%. The polymer solution obtained was pale yellow and could be stored for more than 6 months at room temperature. Colourless films were prepared by spread-coating the polymer solution on to glass plates. After drying, these films were readily soluble in dimethyl formamide. Brief boiling in a 0.05% aqueous solution of p-toluene sulphonic acid gave crosslinked films which were insoluble in dimethyl formamide. The same result was obtained by allowing 2.5 g of ethoxy acetonitrile carbonate instead of 2.3 g of methoxy acetonitrile carbonate to act on the solution of the copolymer in the presence of 0.05 g of sodium butyrate but otherwise following the same procedure.

EXAMPLE 8

210 g of a polyester of 1 mol of adipic acid, 1.5 mol of phthalic acid and 4 mols of trimethylol propane, with an OH-content of 10.6% and an acid number of 0.7 were dissolved in 265 g of ethylene glycol monomethyl ether acetate. Following the introduction of 0.15 g of sodium pivalate, 83 g of methoxy acetonitrile carbonate were added dropwise at 90° to 95° C followed by stirring for 3 hours at 100° C (conversion: 97% of the theoretical). The storable, substantially colourless solution thus obtained was coated on to glass and metal substrates following the addition of 0.1% of p-toluene sulphonic acid, based on solids. After drying for 1 hour at 120° C elastic films were obtained which are insoluble in such solvents as acetone or dimethyl formamide.

EXAMPLE 9

A polyester with a hydroxy number of 293 and an acid number of 1.0 was prepared from 3 mols of trimethylol propane, 1 mol of hexane diol, 2 mols of phthalic acid and 1 mol of adipic acid, and was dissolved in ethylene glycol monomethyl ether acetate. 0.2 g of sodium pivalate were introduced into 360 g of the 50% solution, followed by the dropwise addition of 90° to 95° C of 111 g of methoxy acetonitrile carbonate. The reaction ceased after 6 hours (conversion: 98% of the theoretical). A solution of an autocrosslinking polyester which was storable as such was obtained. Following the addition of 0.5% of p-toluene sulphonic acid, based on solids, the modified polyester crosslinked over a period of 3 days at room temperature or, following the addition of 1% of phosphorous oxychloride, over a period of 2 hours at 20° C.

EXAMPLE 10

A clear solution was prepared from 180 g of a polyester (of 2 mols of phthalic acid, 1 mol of adipic acid, 3 mols of trimethylol propane and 1 mol of hexane diol) with an OH-content of 8.9% and an acid number of 1.0, with 86 g of ethylene glycol monomethyl ether acetate. 0.2 g of sodium propionate was added to this solution followed by the dropwise addition at 95° to 100° C of 106 g of methoxy acetonitrile carbonate. The mixture was then stirred at 105° C until the evolution of $CO_2$ had ceased (conversion: 96% of the theoretical). Metal and glass substrates were coated with the 75% storable solution thus obtained. Elastic crosslinked layers were obtained after 1 hour at 180° C. When crosslinking was carried out with an addition of 1% of p-toluene sulphonic acid, glass-hard brittle films were obtained after 30 minutes at 160° C.

EXAMPLE 11

Following the addition of 0.2 g of sodium propionate, 80 g of methoxy acetonitrile carbonate were added dropwise over a period of 2 hours at 90° to 95° C to 100 g of a polyether with a hydroxyl number of 400 and an average molecular weight of 450 (prepared from trimethylol propane and propylene oxide). In order to complete the reaction, the reaction mixture was kept for another 4 hours at 95° C (conversion: 96%). Following the addition of 0.1 to 1% of phosphorous acid or phosphoric acid, the polyether thus modified could be crosslinked over a period of 1 hour at 120° to 150° C.

EXAMPLE 12

30 g of a polyester with a hydroxyl number of 385 and an acid number of 54, prepared from 3 mols of adipic acid 3 mols of phthalic acid and 8 mols of trimethylol propane were dissolved in 45 ml of ethylene glycol monomethyl ether acetate. Following the addition of 0.05 g of sodium pivalate, 24.3 g of methoxy acetonitrile carbonate were added dropwise to the solution which was then kept at 90° C until the evolution of $CO_2$ had ceased (7 hours). Conversion amounted to 97%. A solution of an autocrosslinking polyester was obtained in this way which was storable for several months at 20° to 50° C and which could be crosslinked in the absence of a catalyst over a period of 60 to 90 minutes at 120° to 150° C.

EXAMPLE 13

75 g of ethylene glycol monomethyl ether acetate were added to 140 g of a polyester with a hydroxyl number of 410 and an acid number of 12, prepared from trimethylol propane glycol and phthalic acid, and the mixture was heated until a clear solution had formed. 0.2 g of sodium propionate were then added, followed by the dropwise addition over a period of 2 hours at 95° to 100° C of 110 g of methoxy acetonitrile carbonate. The reaction mixture was then stirred at 100° C until the evolution of $CO_2$ had ceased (4 hours, conversion: 96%). A solution of an autocrosslinking, storable polyester was obtained. By adding 0.01 to 5% of catalyst (phosphoric acid, phosphorous acid, phosphorus oxychloride, maleic acid, p-toluene sulphonic acid), hard or soft crosslinked films with a high resistance to solvents were formed on metal glass and wood after 20 hours at room temperature or after only 60 minutes at elevated temperature (120° C).

EXAMPLE 14

100 g of a heavily branched polyester of phthalic acid and trimethylol propane with an OH-content of 8% were dissolved at 90° C in 100 g of a mixture of xylene and methyl glycol acetate (1:1) and the resulting solution reacted for 6 hours at 95° C with 62 g of methoxy acetonitrile carbonate following the addition of 0.15 g of sodium pivalate (conversion: 96%). A solution which was clear even at room temperature, of the heavily branched polyaddition product with excellent stability in storage (5 months at room temperature) was obtained. When this solution was cast on to substrates following the addition of catalytic quantities (0.1% based on solids) of p-toluene sulphonic acid, films were obtained which crosslinked after heating for 4 hours to 100° C and which were insoluble in xylene-methyl glycol acetate.

EXAMPLE 15

200 g of a polyester with an OH-content of 5%, prepared from 2 mols of phthalic acid, 2 mols of isophthalic acid, 2 mols of trimethylol propane and 3 mols of hexane diol, were dissolved at 90° C to 90 g of a mixture of xylene and ethylene glycol monoethyl ether acetate (1:1). Following the addition of 0.1 g of sodium pivalate as catalyst,
  a. 40.2 g of methoxy acetonitrile carbonate;
  b. 44.5 g of ethoxy acetonitrile carbonate;
  c. 48.8 g of n-propoxy acetonitrile carbonate; and
  d. 48.8 g of iso-propoxy acetonitrile carbonate were added dropwise at 95° to 100° C, the reaction mixtures being kept at 100° C until the evolution of $CO_2$ had ceased (6 hours; conversion: 97%). Solutions, which were clear even at room temperature, or autocrosslinking polyesters with excellent stability in storage were obtained. Metal and glass were coated with solution (a) thus obtained. Elastic crosslinked films with the following service properties were obtained after stoving at 160° and 260° C:

| Stoving conditions | 60" 260° C | 90" 260° C | 30' 160° C |
|---|---|---|---|
| Gloss 60° according to Gardner ASTM D 523-67 | 96 | 96 | 96 |
| Pendulum hardness according to Konig and DIN 53 157 in seconds | — | — | 127" |
| Buchholz's indentation resistance according to DIN 51 153 | 200 | 250 | 125 |
| Pencil hardness | HB | H | HB-H |
| Lattice cut according to DIN 53 151 | 0 | 0 | 0 |
| Impact indentation according to Gardner ASTM D 2794, Ball-$\phi$ ½ inch Dimension: inch-pound direct | 82+ | 82+ | 82+ |
| indirect | 82+ | 82+ | 82+ |
| T-bend test [according to European Coil Coating Association (E.C.C.A. Test Method Q 6)] E-sheet | 0 | 0 | — |
| Alu-Alodine 1200 | — | ½ | — |
| Swellability after 1 minute's exposure at room temperature to the action of Ethyl acetate | — | — | 1 |
| Ethyl glycolacetate | — | — | 4 |
| Toluene | — | — | 4 |

Comparison Example 1

(U.S. Pat. No. 3,531,425)

The procedure was as described in Example 15, except that 0.5 g of diazabicyclooctane (DABCO) was used at catalyst instead of sodium pivalate. An almost 100% conversion was obtained after about 6 hours at 100° to 105° C.

The product discoloured after stoving for 60 seconds at 260° C and showed inadequate resistance of solvents.

Comparison Example 2

(German Offenlegungsschrift No. 2,338,834)

The procedure was described as in Example 15, except that sodium fluoride was used instead of sodium pivalate as catalyst. The evolution of $CO_2$-gas began, but only very sluggishly, at 105° C. The reaction took place at 130° C but was accompanied by partial crosslinking.

Comparison Example 3

(German Offenlegungsschrift No. 2,338,843)

The procedure was as described in Example 15, except that potassium fluoride was used instead of sodium pivalate. In this case, too, the evolution of $CO_2$-gas took place sufficiently quickly at 130° C. However, the autocrosslinking polymer underwent partial crosslinking at that temperature.

We claim:

1. In the process of producing a storable, autocrosslinkable product containing N-alkoxymethyl groups which is soluble in organic solvents by reacting 5-alkoxymethyl-1,3,4-dioxazol-2-one with a polymerization, polycondensation or polyaddition product having an average molecular weight above 600 and having an average of more than one Zerewitinoff-active hydrogen atom in the molecule at a temperature of from 50°-110° C with substantially complete elimination of carbon dioxide from the 5-alkoxymethyl-1,3,4-dioxazol-2-one, the improvement wherein the process is carried out in the presence of a catalytic amount of at least one alkali metal salt of a carboxylic acid.

2. The process of claim 1 wherein the alkali metal salt of the carboxylic acid is of the formula:

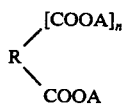

wherein R is an aliphatic hydrocarbon radical having 1 to 22 carbon atoms, a saturated or monoolefinically unsaturated cycloaliphatic hydrocarbon radical having 5 to 20 carbon atoms or said radical substituted by alkyl having 1 to 4 carbon atoms or phenyl, an araliphatic hydrocarbon radical having 7 to 8 carbon atoms or an aromatic hydrocarbon radical having 6 to 10 carbon atoms or said radical substituted with alkyl having 1 to 4 carbon atoms; A is sodium, potassium, rubidium or caesium and $n$ is 0 or 1.

3. The process of claim 2 wherein A is sodium.

4. The process of claim 2 wherein A is sodium, R is an aliphatic hydrocarbon radical having 2 to 12 carbon atoms and $n$ is 0.

5. In the process of producing a storable, autocrosslinkable product containing N-alkoxymethyl groups which is soluble in organic solvents by reacting 5-alkoxymethyl-1,3,4-dioxazol-2-one with a polyester having an average molecular weight above 600 and having an average of more than one Zerewitinoff-active hydrogen atom in the molecule at a temperature of from 50-110° C with substantially complete elimination of carbon dioxide from the 5-alkoxymethyl-1,3,4-dioxazol-2-one, the improvement wherein the process is carried out in the presence of a catalytic amount of at least one alkali metal salt of a carboxylic acid.

* * * * *